(12) United States Patent
Matsui

(10) Patent No.: US 11,482,946 B2
(45) Date of Patent: Oct. 25, 2022

(54) ELECTRIC POWER CONVERSION DEVICE

(71) Applicant: Mitsubishi Electric Corporation, Tokyo (JP)

(72) Inventor: Kota Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/408,691

(22) Filed: Aug. 23, 2021

(65) Prior Publication Data
US 2022/0123666 A1    Apr. 21, 2022

(30) Foreign Application Priority Data
Oct. 20, 2020 (JP) .............................. JP2020-175729

(51) Int. Cl.
*H02M 3/335* (2006.01)
*H02M 7/217* (2006.01)
*H02M 1/42* (2007.01)
*H02M 1/00* (2006.01)
*H02M 7/5395* (2006.01)

(52) U.S. Cl.
CPC ......... *H02M 7/217* (2013.01); *H02M 1/0003* (2021.05); *H02M 1/0083* (2021.05); *H02M 1/4283* (2021.05); *H02M 3/33573* (2021.05); *H02M 7/5395* (2013.01)

(58) Field of Classification Search
CPC .. H02M 3/33569; H02M 3/335; H02M 7/217; H02M 3/33573; H02M 1/4283; H02M 1/143; H02M 1/0083; H02M 1/0003; H02M 7/5395
See application file for complete search history.

(56) References Cited

U.S. PATENT DOCUMENTS

| 10,218,260 B1* | 2/2019 | Jang ..................... H02M 3/00 |
| 11,296,608 B2* | 4/2022 | Matsui ................. H02M 1/007 |
| 2013/0058134 A1 | 3/2013 | Yamada et al. |
| 2014/0354245 A1* | 12/2014 | Batikoff ............... H02M 7/217 323/205 |

FOREIGN PATENT DOCUMENTS

| JP | 4805303 B2 | 11/2011 |
| WO | 2011/151940 A1 | 12/2011 |

\* cited by examiner

*Primary Examiner* — Adolf D Berhane
(74) *Attorney, Agent, or Firm* — Sughrue Mion, PLLC; Richard C. Turner

(57) ABSTRACT

Electric power conversion devices carry out feedback control, so that a difference between a duty ratio and a duty ratio target value may approach zero, while a duty ratio, which becomes the origin of a drive signal of a semiconductor switching element, is limited by a prescribed upper limit.

The control part issues a first operation result, which is limited by a first upper limit, with respect to an operation value which is on an operation process for controlling an output electric power, and further a second operation result which is limited by a second upper limit, which is set as a value higher than the first upper limit, with respect to an operation value. In addition, the control part is configured to carry out the proportional plus integral control, by a difference between the second operation result and a target value of the second operation result.

6 Claims, 3 Drawing Sheets

ELECTRIC POWER CONVERSION DEVICE

FIELD OF THE INVENTION

The present disclosure relates to an electric power conversion device.

BACKGROUND OF THE INVENTION

Conventional electric power conversion devices include a first electric power conversion circuit which carries out the conversion of alternative current to direct current, on the output of an alternating current electric power source; a smoothing capacitor which is connected to a direct current side of the first electric power conversion circuit; a second electric power conversion circuit which converts electric power supplied to the smoothing capacitor and outputs the electric power to a load; and a control part which drives the first electric power conversion circuit so that an input power factor may be improved, and further the voltage of the smoothing capacitor may become a desired direct current voltage, and in addition, drives the second electric power conversion circuit so that a desired electric power may be supplied to the load.

An electric power conversion device of this kind is, as shown in the Patent Document 1, for example, equipped with a semiconductor switching element, where the conversion of electric power is realized by a control part, which controls the duty ratio of the semiconductor switching element. At this time, from a viewpoint of securing the safety and controllability of a semiconductor switching element, a drive signal according to a desired duty ratio is supplied to a semiconductor switching element, when driving the semiconductor switching element. The electric power converter is configured to limit the magnitude of a drive signal (duty ratio) to a value between a prescribed upper limit and a prescribed lower limit.

Moreover, in the Patent Document 2, an electric power conversion device aiming at an improvement in the efficiency of electric power conversion is proposed in which feedback control is carried out so that the difference between a predetermined target value of a duty ratio and a value of a calculated output duty ratio may approach zero, where a target voltage of a smoothing capacitor is issued, and further, an input and output current instruction of the electric power conversion device is issued so that the voltage of a smoothing capacitor may follow the target voltage. Thereby, the electric power conversion device attains the improvement in the efficiency of electric power conversion.

CITATION LIST

Patent Literature

Patent Document 1: JP No. 4805303
Patent Document 2: WO 2011/151940

SUMMARY OF THE INVENTION

Technical Problem

Here, explanation will be made about a case in which the duty ratio is limited by a prescribed upper limit, in order to secure the safety and controllability of a semiconductor switching element, and in addition, feedback control is carried out so that the difference between a duty ratio which is calculated at this time and a duty ratio target value may approach zero. At this time, if the duty ratio target value is set close to the upper limit, a large difference from the target value cannot be obtained, when the calculated duty ratio is limited by the upper limit. As for the output of feedback control, only a small value will be output. Therefore, the target voltage of a smoothing capacitor cannot be changed largely either, and the duty ratio takes a fair amount of time to converge to a target value.

That is, when the duty ratio is limited by an upper limit, for securing the safety and controllability and further is used for feedback control, a fair amount of time is required until the motion for electric power conversion becomes a steady state. Thereby, in particular, when the load of an electric power conversion device is a battery, the extension of charging time is considered an issue.

The present disclosure is made to overcome those problems mentioned above. In the electric power conversion device which limits the duty ratio to a prescribed upper limit, where the duty ratio becomes the origin of a drive signal of a semiconductor switching element, and in addition, carries out feedback control so that the difference between a duty ratio and a duty ratio target value may approach zero, the present disclosure aims at offering an electric power conversion device which is capable of reducing the time until the motion for electric power conversion becomes a steady state, and realizing the reduction in the charging time of a battery.

Solution to Problem

An electric power conversion device which is disclosed in the present disclosure includes an electric power conversion circuit which is provided between a power source and a load, converts an input electric power supplied from the power source, and supplies an output electric power to the load, and a control part which controls the output electric power of the electric power conversion circuit by a processing including proportional plus integral control, wherein the control part issues a first operation result limited by a first upper limit, with respect to an operation value, which is on an operation process for controlling the output electric power, and a second operation result limited by a second upper limit, which is set as a value higher than the first upper limit, with respect to the operation value, and in addition, carries out the proportional plus integral control, by a difference between the second operation result and a target value of the second operation result.

Advantageous Effects of Invention

According to the electric power conversion device which is disclosed in the present application, a duty, which becomes the origin of a drive signal of a semiconductor switching element, is limited by a prescribed upper limit, and feedback control is carried out, so that the difference between a duty ratio and a duty ratio target value may approach zero. In such an electric power conversion device, it can be realized that the time until the motion for electric power conversion becomes a steady state is reduced, and furthermore, the charging time of a battery is reduced.

DESCRIPTION OF EMBODIMENTS

Embodiment 1

Explanation will be made about the Embodiment 1, based on drawings. It is to be noted that, the same symbol indicates identical or corresponding portions, in each of the drawings.

Figure 1:
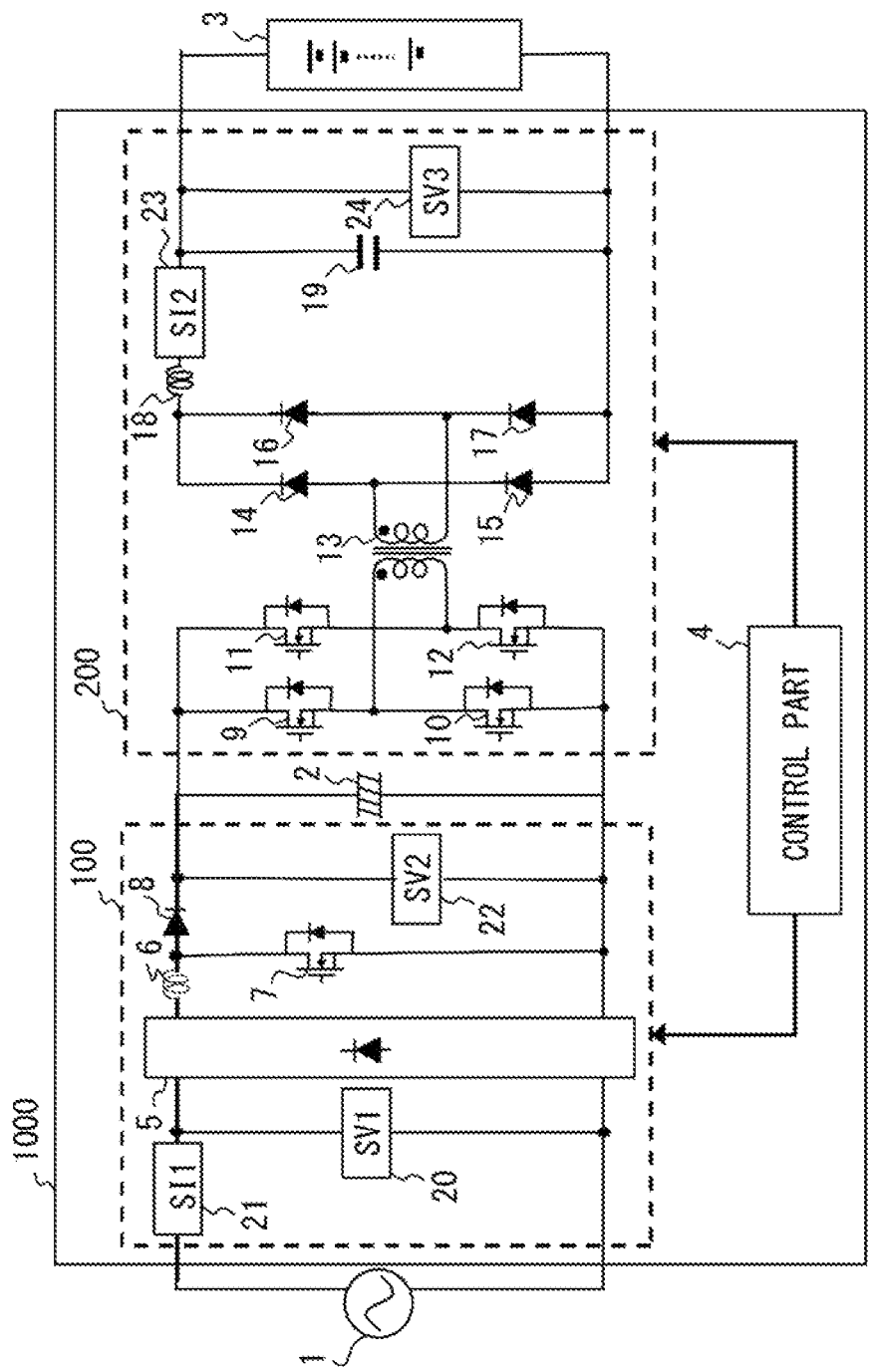
FIG. 1 is a circuit configuration diagram for showing an electric power conversion device in accordance with the Embodiment 1.

FIG. 1 is a drawing for showing the schematic constitution of an electric power conversion device in accordance with the Embodiment 1. As shown in the drawing, the electric power conversion device 1000 is equipped with a first electric power conversion circuit 100 which carries out the conversion of alternative current to direct current, a smoothing capacitor 2, a second electric power conversion circuit 200 which converts a voltage value and outputs electric power to a load, and a control part 4 which controls those operations. In response to the receipt of input electric power from the alternating current electric power source 1, a high voltage battery 3, which is a load connected at the output part, is charged.

The first electric power conversion circuit 100 is equipped with a semiconductor switching element 7, and the second electric power conversion circuit 200 is equipped with first to fourth semiconductor switching elements 9, 10, 11, and 12. Those circuits are a circuit which carries out the conversion of electric power by the switching operation of those semiconductor switching elements. Moreover, a current detection circuit or a voltage detection circuit is attached to a predetermined part, and a detected current value and a detected voltage value are transferred to the control part 4. The control part 4 issues an input current instruction value and an output current instruction value, and carries out PWM control to the semiconductor switching element 7 of the first electric power conversion circuit 100 and the first to fourth semiconductor switching elements 9, 10, 11, and 12 of the second electric power conversion circuit 200, so that a detected current value may follow the current instruction value.

Here, the semiconductor switching element employs, for example, a MOSFET (Metal Oxide Semiconductor Field Effect Transistor) which has a built in diode, between a source and a drain thereof.

The first electric power conversion circuit 100 consists of elements, including from an alternating current electric power source 1, as an alternating input power source, to a smoothing capacitor 2. The alternating current electric power source 1 is connected, through an input current detection circuit 21 (SI1), to a diode bridge 5 as a rectification circuit, and the input voltage detection circuit 20 (SV1) is connected in parallel with the diode bridge 5.

The output of the diode bridge 5 is connected to a reactor 6, as a current limiting circuit. The semiconductor switching element 7 and a rectifier diode 8 are connected in the latter part of the reactor 6, and the cathode side of the rectifier diode 8 is connected to the positive electrode of the smoothing capacitor 2 of an output part. The other end of the semiconductor switching element 7 which is connected to the latter part of the reactor 6 is connected to the negative electrode of the smoothing capacitor 2. Moreover, the direct current voltage detection circuit 22 (SV2) which detects a voltage value of the smoothing capacitor 2 is connected in parallel with the smoothing capacitor 2.

Moreover, the second electric power conversion circuit 200 consists of elements including from the smoothing capacitor 2 to a high voltage battery 3. The latter part of the smoothing capacitor 2 is connected to the first semiconductor switching element 9, the second semiconductor switching element 10, the third semiconductor switching element 11, and the fourth semiconductor switching element 12. The drains of the first semiconductor switching element 9 and the third semiconductor switching element 11 are connected to the positive electrode side of the smoothing capacitor 2, and the sources of the second semiconductor switching element 10 and the fourth semiconductor switching element 12 are connected to the negative electrode side of the smoothing capacitor 2.

Moreover, one end of the primary winding of a transformer 13 is connected to a connecting point of the source of the first semiconductor switching element 9 and the drain of the second semiconductor switching element 10, and the other end is connected to a connecting point of the source of the third semiconductor switching element 11 and the drain of the fourth semiconductor switching element 12. The secondary winding of the transformer 13 is connected to a full bridge composition, which is made of a first rectifier use diode 14, a second rectifier use diode 15, a third rectifier use diode 16, and a fourth rectifier use diode 17. The latter part of the first to fourth rectifier use diodes 14-17 is connected to the smoothing use reactor 18, the output current detection circuit 23 (SI2), and the smoothing use capacitor 19. The subsequent part is defined as an output of the second electric power conversion circuit 200, and is connected with a load, that is, a high voltage battery 3. Here, the output voltage detection circuit 24 (SV3) is connected, in parallel with a smoothing use capacitor 19.

Next, explanation will be made about how to carry out PWM control to the semiconductor switching element 7 of the first electric power conversion circuit 100 and the semiconductor switching elements 9, 10, 11, and 12 of the second electric power conversion circuit 200.

Figure 2:
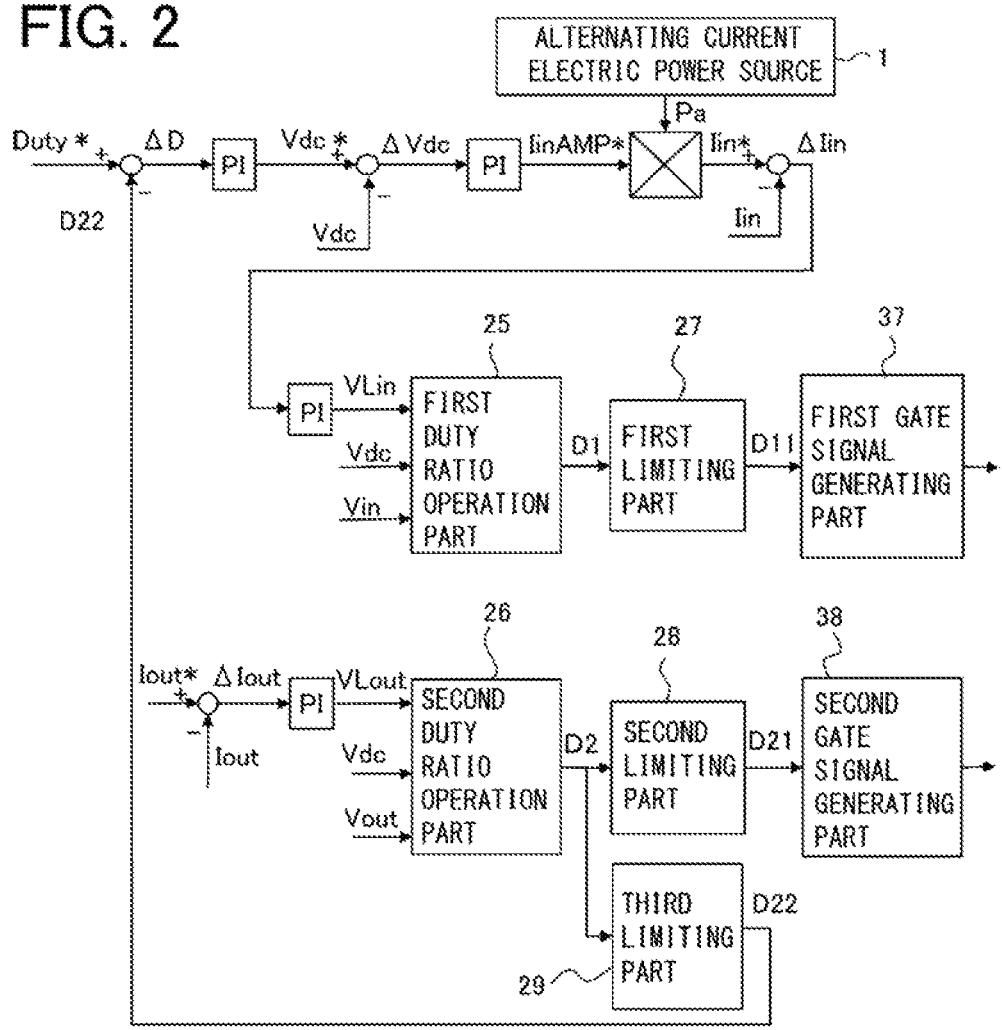
FIG. 2 is an explanatory diagram for showing a method of controlling the electric power conversion device in accordance with the Embodiment 1.

FIG. 2 is a diagram for showing the method of carrying out PWM control to the semiconductor switching element 7 of the first electric power conversion circuit 100 and the semiconductor switching elements 9, 10, 11, and 12 of the second electric power conversion circuit 200. This PWM control is carried out by the control part 4.

First, explanation will be made about how to control the second electric power conversion circuit 200.

The control part 4 carries out a proportional plus integral (PI) control, based on a feedback factor, and sets the output as a target voltage VLout, which is a target value as a voltage applied to the smoothing use reactor 18, where the feedback factor is defined as the difference ΔIout between an output instruction value Iout* and an output current bout which is detected by the output current detection circuit 23 (SI2).

Here, it is supposed that the number of turns at the primary side of the transformer 13 is N1, and the number of turns at the secondary side is N2, and the semiconductor switching elements 9-12 are operated so that a duty ratio D2 can be maintained. The following equation shows a relation among an output voltage Vout, which is detected in the output voltage detection circuit 24 (SV3), a direct current voltage Vdc, which is detected in the input voltage detection circuit 20 (SV1), and the target voltage VLout, where the detection of those voltages are carried out, with respect to one cycle period of the switching cycle of the semiconductor switching elements 9-12.

$$Vout = N2/N1 \times Vdc \times D2 - VLout \quad (1)$$

On the basis of the equation (1), the second duty ratio operation part 26 calculates a duty ratio D2 (duty ratio for the second electric power conversion circuit 200) according to the equation (2), which is shown below.

$$D2 = N1/N2 \, (Vout + VLout)/Vdc \quad (2)$$

This value is limited, in the second limiting part 28, by a first upper limit which is set for securing the safety and controllability of a semiconductor switching element, and is output as a first operation result D21 (duty ratio of post limitation 1 of the second electric power conversion circuit 200). The second gate signal generating part 38 carries out PWM control according to the first operation result, and outputs a gate signal to each of the semiconductor switching elements 9-12.

The first upper limit is defined as a duty ratio which is physically operatable in the semiconductor switching element, and is set as a value, for example, not greater than one (not greater than 100%). That is, the first upper limit is set, so that the value is operatable in the electric power conversion device, based on the physical feature of an operation value.

Furthermore, at this time, the control part 4 limits the duty ratio D2 by a second upper limit, where the duty ratio D2 is calculated in the second duty ratio operation part 26, and the second upper limit is a value set higher than the first upper limit in the third limiting part 29. Further, the control part 4 outputs the limited duty ratio as a second operation result D22 (duty ratio of post limitation 2 for the second electric power conversion circuit 200). The second upper limit is defined as a value higher than the first upper limit, and is set as a value, for example, not greater than two, which is twice the value of the first upper limit.

Next, explanation will be made about how to control the first electric power conversion circuit 100.

The control part 4 adjusts a direct current voltage target value Vdc* of the smoothing capacitor 2, so that the duty ratio D2 of the semiconductor switching element of the second electric power conversion circuit 200 may follow a target value (value not greater than one). Since an input current is operated according to this target value, the conversion of electric power is realized with a high degree of efficiency.

That is, the control part 4 carries out the proportional plus integral control to the difference ΔD between a second operation result and a duty ratio target value Duty*, and outputs the output as a direct current voltage target value Vdc* of the smoothing capacitor 2, where the second operation result D22 (duty ratio of post limitation 2 for the second electric power conversion circuit 200) is a value expressing the duty ratio D2.

Here, the control part 4 issues a first operation result which is limited by a first upper limit, with respect to the operation value which is on an operation process for controlling an output electric power, and further a second operation result which is limited by the second upper limit, with respect to the operation value, where the second upper limit is set as a value higher than the first upper limit. In addition, the control part 4 carries out the proportional plus integral control, by the difference between the second operation result and the target value of the second operation result.

And, the control part 4 carries out the proportional plus integral control to the difference ΔVdc between the direct current voltage Vdc which is detected by the direct current voltage detection circuit 22 (SV2) and the direct current voltage target value Vdc* of the smoothing capacitor 2, and outputs the output as an input current amplitude instruction value Iin AMP* of the electric power conversion device 1000. The control part 4 issues an input current instruction value Iin*, from this input current amplitude instruction value Iin AMP* and a synchronous sine wave Pa of alternating current electric power source 1, where the synchronous sine wave is issued as a signal having an amplitude one and is in synchronization with an input voltage Vin, which is detected by the input voltage detection circuit 20 (SV1).

Next, the difference ΔIin between the input current instruction value Iin* and the input current Iin is defined as a feedback factor, and the proportional plus integral control is carried out to produce an output, which is defined as a target voltage VLin, where the VLin is a target value as a voltage applied of the reactor 6.

Next, the semiconductor switching element 7 is operated at an arbitrary duty ratio D1. In that case, the relation among the input voltage Vin, the direct current voltage Vdc, and the target voltage VLin is denoted by the following equation (3), with respect to one cycle period of the switching cycle of the semiconductor switching element 7.

$$Vin = VLin + Vdc \, (1 - D1) \quad (3)$$

On the basis of this equation, the first duty ratio operation part 25 calculates a duty ratio D1 (duty ratio for the first electric power conversion circuit 100) according to the equation (4), which is shown below.

$$D1 = 1 - (Vin - VLin)/Vdc \quad (4)$$

This value is limited by an upper limit, which is set by the first limiting part 27 for securing the safety and controllability of a semiconductor switching element, and the value of a duty ratio D11 of post limitation for the first electric power conversion circuit 100 is output. The first gate signal generating part 37 carries out PWM control according to the output value, and outputs a gate signal to the semiconductor switching element 7.

As mentioned above, the control part 4 carries out the proportional plus integral control to the difference ΔD, between a second operation result D22 (duty ratio of post limitation 2 for the second electric power conversion circuit 200) and a duty ratio target value Duty*. In addition, the control part 4 is configured to output the output, as a direct current voltage target value Vdc* of the smoothing capacitor 2. Therefore, a large difference can be taken between the duty ratio target value Duty* (a value not greater than one) and the second operation result D22 (duty ratio of post limitation 2 for the second electric power conversion circuit 200) (a value not greater than two), and thereby, it becomes possible to cause a large change in the direct current voltage target value Vdc*.

That is, the control part 4 controls the input and output of the first electric power conversion circuit 100, and in addition, controls the input and output of the second electric power conversion circuit 200, by a duty ratio operation of a semiconductor switching element, and further controls the first electric power conversion circuit or the second electric power conversion circuit, based on the result of the proportional plus integral control, by the difference between "the value expressing a duty ratio" and its target value, so that the duty ratio of a semiconductor switching element may approach the target value. And the control part 4 is the one which controls the voltage of a smoothing capacitor. The operation value which is on an operation process is a derived one in order to calculate a duty ratio. The first operation result indicates a duty ratio, and the second operation result indicates "the value expressing a duty ratio".

Therefore, it becomes possible to reduce the time until the duty ratio D2 converges to a target value.

By these measures, an electric power conversion device limits a duty ratio to a prescribed upper limit (not greater than one), and in addition, carries out feedback control, so that the difference between the duty ratio and the duty ratio target value may approach zero, where the duty ratio becomes the origin of the drive signal of a semiconductor switching element. In such an electric power conversion device, it becomes possible to reduce the time until the motion for electric power conversion becomes a steady state, and furthermore, the charge of a battery can be realized in a shortened period.

It is to be noted that, the proportional plus integral control which is explained in the present application is the control in which integral action is added to proportional action, and is the one which is generally performed as a control technique to follow an operation, with respect to a prescribed target value.

Figure 3:
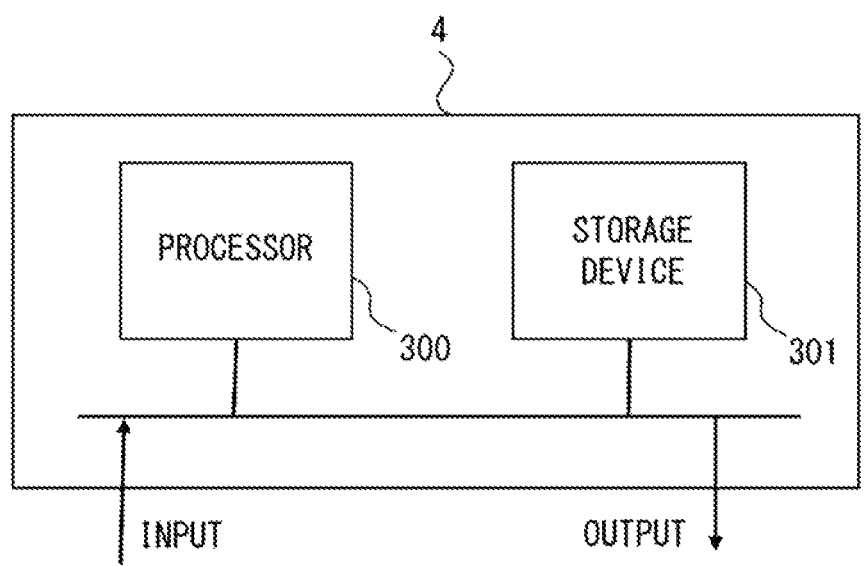
FIG. 3 is a configuration diagram for showing an example of the hardware of a control circuit in accordance with the Embodiment 1.

It is to be noted that, the control part 4 consists of a processor 300 and a storage device 301, as shown in FIG. 3, which is an example of the hardware constitution thereof. Although the constitution on the inside of the storage device 301 is not illustrated in the drawing, the storage device is provided with volatile storage devices, such as a random access memory, and non-volatile auxiliary storage devices, such as a flash memory. Moreover, the storage device can be provided with an auxiliary storage device of a hard disk type, instead of a flash memory. The processor 300 executes a program which is input from the storage device 301. In this case, the program, which is transferred from an auxiliary storage device through a volatile storage device, is input to the processor 300. Moreover, the processor 300 may output the data of an operation result and others, to a volatile storage device of the storage device 301, and may save the data through a volatile storage device in the auxiliary storage device.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment.

It is therefore understood that numerous modifications which have not been exemplified can be devised without departing from the scope of the present application. For example, at least one of the constituent components may be modified, added, or eliminated.

EXPLANATION OF NUMERALS AND SYMBOLS

1 Alternating current electric power source:
2 Smoothing capacitor:
3 High voltage battery:
4 Control part:
5 Diode bridge:
6 Reactor:
7 Semiconductor switching element:
8 Rectifier diode:
9 First semiconductor switching element:
10 Second semiconductor switching element:
11 Third semiconductor switching element:
12 Fourth semiconductor switching element:
13 Transformer:
14 First rectifier use diode:
15 Second rectifier use diode:
16 Third rectifier use diode:
17 Fourth Rectifier use diode:
18 Smoothing use reactor:
19 Smoothing use capacitor:
20 Input voltage detection circuit:
21 Input current detection circuit:
22 Direct current voltage detection circuit:
23 Output current detection circuit:
24 Output voltage detection circuit:
25 First duty ratio operation part:
26 Second duty ratio operation part:
27 First limiting part:
28 Second limiting part:
29 Third limiting part:
37 First gate signal generating part:
38 Second gate signal generating part:
100 First electric power conversion circuit:
200 Second electric power conversion circuit:
300 Processor:
301 Storage device:
1000 Electric power conversion device

What is claimed is:

1. An electric power conversion device comprising:
   an electric power conversion circuit which is provided between a power source and a load, converts an input electric power supplied from the power source, and supplies an output electric power to the load, and
   a controller which controls the output electric power of the electric power conversion circuit by a processing including proportional plus integral control,
   wherein the controller issues a first operation result limited by a first upper limit, with respect to an operation value, which is on an operation process for controlling the output electric power, and a second operation result limited by a second upper limit, which is set as a value higher than the first upper limit, with respect to the operation value, and in addition, carries out the proportional plus integral control, by a difference between the second operation result and a target value of the second operation result.

2. The electric power conversion device as claimed in claim 1,
   wherein the first upper limit is set as a value which is operatable in the electric power conversion device based on a physical feature of the operation value.

3. The electric power conversion device as claimed in claim 1,
   wherein the electric power conversion circuit consists of a smoothing capacitor,
   a first electric power conversion circuit which converts an input electric power supplied from the power source and outputs to the smoothing capacitor, and
   a second electric power conversion circuit which is connected to the load at an output side, and is equipped with a semiconductor switching element, which converts a direct current electric power of the smoothing capacitor.

4. The electric power conversion device as claimed in claim 2,
   wherein the electric power conversion circuit consists of a smoothing capacitor,
   a first electric power conversion circuit which converts an input electric power supplied from the power source, and outputs to the smoothing capacitor, and
   a second electric power conversion circuit which is connected to the load at an output side, and is equipped with a semiconductor switching element, which converts a direct current electric power of the smoothing capacitor.

5. The electric power conversion device as claimed in claim 3,
wherein the controller controls an input and output of the first electric power conversion circuit; and controls an input and output of the second electric power conversion circuit by a duty ratio operation of the semiconductor switching element;
and in addition, controls the first electric power conversion circuit or the second electric power conversion circuit, based on a result of the proportional plus integral control, so that the duty ratio of the semiconductor switching element may approach a target value; and further controls a voltage of the smoothing capacitor,
further wherein the operation value which is on the operation process is derived in order to calculate the duty ratio, and
the first operation result is the duty ratio, and
the second operation result is a value expressing the duty ratio.

6. The electric power conversion device as claimed in claim 4,
wherein the controller controls an input and output of the first electric power conversion circuit; and controls an input and output of the second electric power conversion circuit, by a duty ratio operation of the semiconductor switching element; and in addition controls the first electric power conversion circuit or the second electric power conversion circuit, based on a result of the proportional plus integral control, so that the duty ratio of the semiconductor switching element may approach a target value; and further controls a voltage of the smoothing capacitor,
further wherein the operation value which is on the operation process is derived in order to calculate the duty ratio, and
the first operation result is the duty ratio, and
the second operation result is a value expressing the duty ratio.

* * * * *